(12) United States Patent
Iwaki et al.

(10) Patent No.: US 11,183,898 B2
(45) Date of Patent: Nov. 23, 2021

(54) ROTARY ELECTRIC MACHINE AND MANUFACTURING METHOD FOR ROTARY ELECTRIC MACHINE

(71) Applicant: Hitachi Industrial Equipment Systems Co., Ltd., Tokyo (JP)

(72) Inventors: Genzo Iwaki, Tokyo (JP); Kazuo Nishihama, Tokyo (JP); Katsuya Hirata, Tokyo (JP); Atsushi Abe, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 157 days.

(21) Appl. No.: 16/314,582

(22) PCT Filed: Jul. 7, 2017

(86) PCT No.: PCT/JP2017/024925
§ 371 (c)(1),
(2) Date: Dec. 31, 2018

(87) PCT Pub. No.: WO2018/008738
PCT Pub. Date: Jan. 11, 2018

(65) Prior Publication Data
US 2019/0207460 A1 Jul. 4, 2019

(30) Foreign Application Priority Data
Jul. 8, 2016 (JP) .............................. JP2016-135810

(51) Int. Cl.
*H02K 3/493* (2006.01)
*H02K 15/12* (2006.01)
*H02K 15/00* (2006.01)

(52) U.S. Cl.
CPC ......... *H02K 3/493* (2013.01); *H02K 15/0018* (2013.01); *H02K 15/12* (2013.01)

(58) Field of Classification Search
CPC ........................... H02K 3/493; H02K 15/0018
(Continued)

(56) References Cited

U.S. PATENT DOCUMENTS

| | | | |
|---|---|---|---|
| 2003/0001441 A1* | 1/2003 | Peterson .................. | H02K 3/24 310/59 |
| 2011/0012474 A1* | 1/2011 | Levit ....................... | B29B 17/02 310/214 |
| 2012/0235534 A1* | 9/2012 | Chamberlin ........... | H02K 3/345 310/215 |

FOREIGN PATENT DOCUMENTS

| | | |
|---|---|---|
| JP | 35-15157 B1 | 10/1960 |
| JP | 36-20510 Y1 | 8/1961 |

(Continued)

OTHER PUBLICATIONS

Ishikawa, Machine Translation of WO2012077215,Jun. 2012 (Year: 2012).*

(Continued)

*Primary Examiner* — Quyen P Leung
*Assistant Examiner* — Eric Johnson
(74) *Attorney, Agent, or Firm* — Crowell & Moring LLP

(57) ABSTRACT

Provided is a rotary electric machine that achieves high motor efficiency with little loss. This rotary electric machine is equipped with: a stator core arranged opposing the circumferential surface of a rotor, and in which multiple slots, wherein openings opening toward the rotor are formed, are formed in the circumferential direction; and coils inserted into the slots. A mixture of a soft magnetic powder and a resin material is formed in the openings of the slots, and the relative permeability of the mixture is 5-35.

5 Claims, 15 Drawing Sheets

(58) Field of Classification Search
USPC .......................................................... 310/214
See application file for complete search history.

(56) References Cited

FOREIGN PATENT DOCUMENTS

| JP | 50108508 U | * | 9/1975 | | |
|---|---|---|---|---|---|
| JP | 53-39408 A | | 4/1978 | | |
| JP | 57-63459 U | | 4/1982 | | |
| JP | 59220039 A | * | 12/1984 | ............ | H02K 3/493 |
| JP | 61-10937 A | | 1/1986 | | |
| JP | 61-26453 A | | 2/1986 | | |
| JP | 61-121733 A | | 6/1986 | | |
| JP | 03207231 A | * | 9/1991 | | |
| JP | 5-276706 | | 10/1993 | | |
| JP | 2000166156 A | * | 6/2000 | | |
| JP | 2000-261998 A | | 9/2000 | | |
| JP | 2002-281709 A | | 9/2002 | | |
| JP | 2015035876 A | * | 2/2015 | ............ | H02K 3/345 |
| WO | WO 98/43340 | | 10/1998 | | |
| WO | WO 2007/100255 A1 | | 9/2007 | | |
| WO | WO 2012/077215 A1 | | 6/2012 | | |

OTHER PUBLICATIONS

Kajiwara, Machine Translation of JP2000166156, Jun. 2000 (Year: 2000).*
Machine Translation of JP50108508, Sep. 1975 (Year: 1975).*
Morita, Machine Translation of JP59220039, Dec. 1984 (Year: 1984).*
Ochaia, Machine Translation of JP61010937, Jan. 1986 (Year: 1986).*
The Engineering Tool Box, "Permeability" (Year: 2020).*
Haruta, Machine Translation of JP03207231, Sep. 1991 (Year: 1991).*
Iwaki, Machine Translation of JP2015035876, Feb. 2015 (Year: 2015).*
International Search Report (PCT/ISA/210) issued in PCT Application No. PCT/JP2017/024925 dated Sep. 5, 2017 with English translation (five (5) pages).
Japanese-language Written Opinion (PCT/ISA/237) issued in PCT Application No. PCT/JP2017/024925 dated Sep. 5, 2017 (five (5) pages).
Extended European Search Report issued in counterpart European Application No. 17824341.6 dated Dec. 17, 2019 (11 pages).

* cited by examiner

| Fe-3Si POWDER VOLUME FRACTION (Vol%) | RELATIVE PERMEABILITY | EFFICIENCY (pu) |
|---|---|---|
| 0 | 1.0 | 100.00 |
| 40 | 4.9 | 100.27 |
| 48 | 5.5 | 100.50 |
| 54 | 7.4 | 100.93 |
| 59 | 10.0 | 101.14 |
| 66 | 15.1 | 101.36 |
| 72 | 20.9 | 101.58 |
| 80 | 30.6 | 101.48 |
| 85 | 37.9 | 101.10 |

※DC MAXIMUM RELATIVE PERMEABILITY

F I G. 10
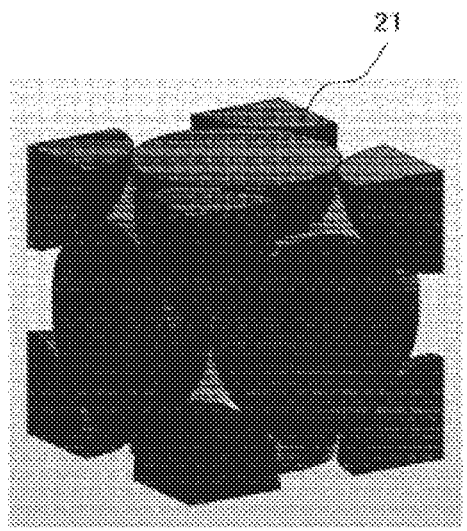
F I G. 11
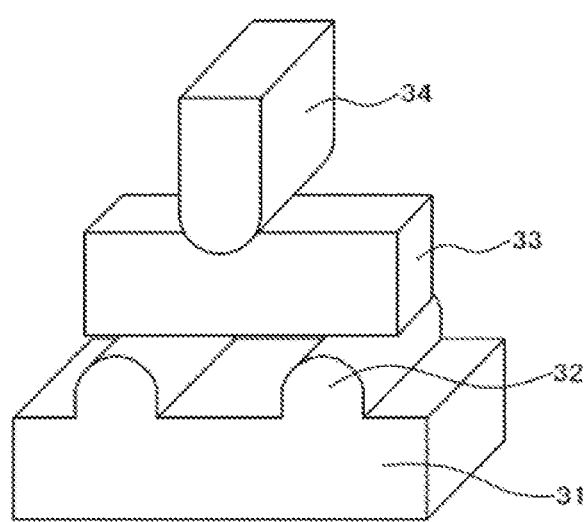

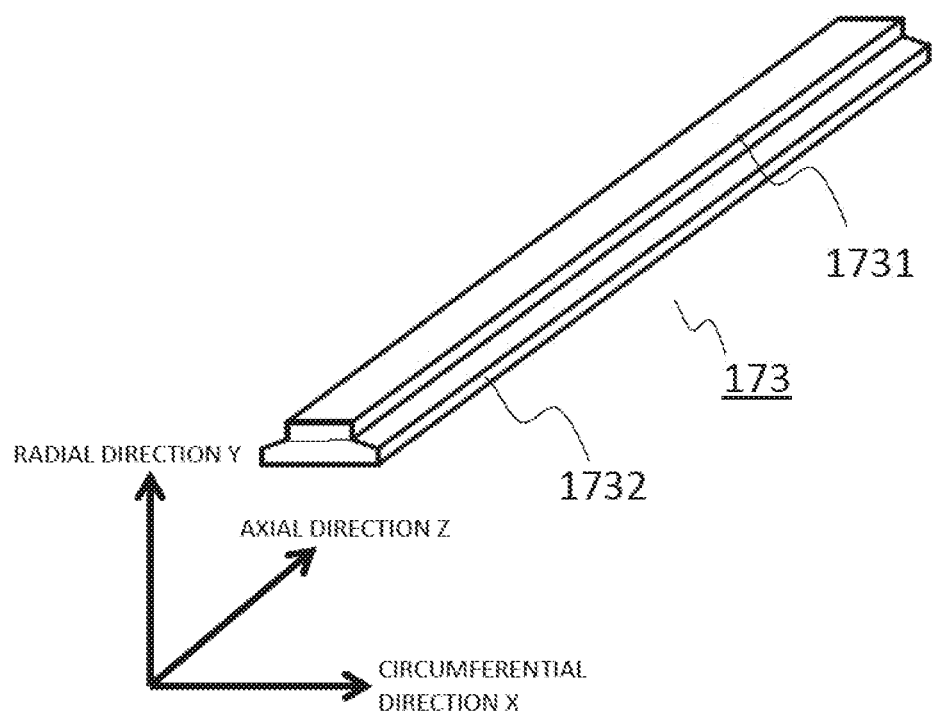

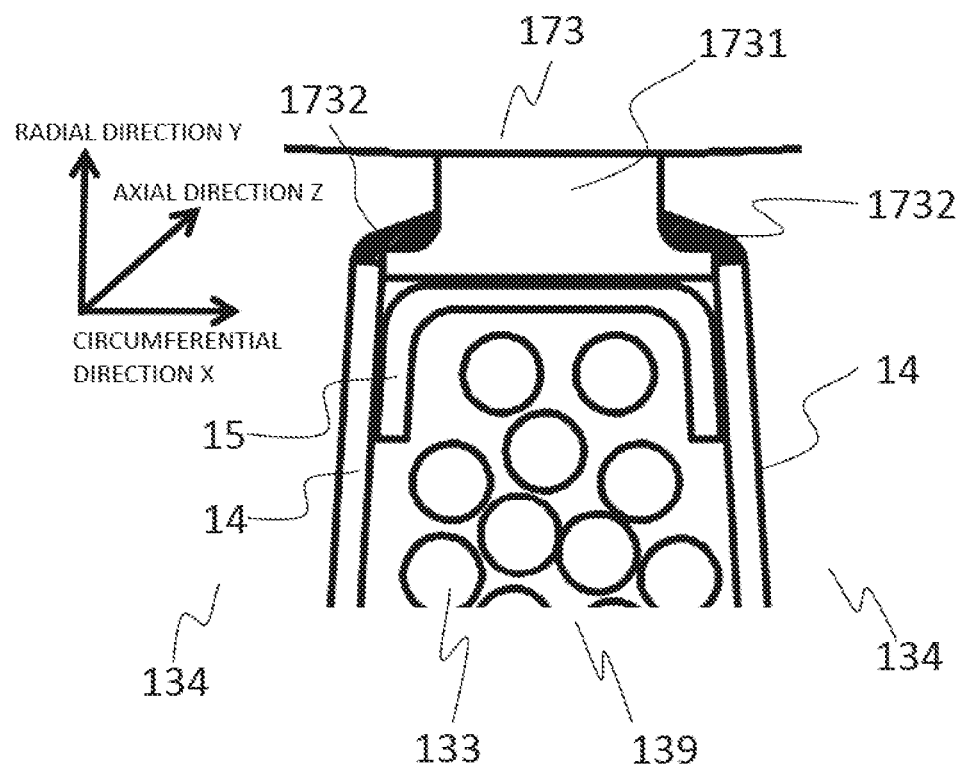
F I G. 21

ROTARY ELECTRIC MACHINE AND MANUFACTURING METHOD FOR ROTARY ELECTRIC MACHINE

TECHNICAL FIELD

The present invention relates to a rotary electric machine and a manufacturing method for the rotary electric machine.

BACKGROUND ART

From a viewpoint of promotion of energy conservation, a rotary electric machine needs to achieve high operation efficiency by reducing a loss and to reduce electrical energy consumption. In a rotary electric machine having an open type (open-slot type) or semi-closed type (semi-open-slot type) slot shape of a stator core, a harmonic flux is known to be generated depending on gap magnetic flux density fluctuation in a gap between a stator and a rotor. A stray load loss due to the harmonic flux accounts for a relatively high proportion in the entire loss.

The magnetic flux density becomes low in a slot opening portion, the magnetic flux density becomes high in a teeth portion of the stator core, and the magnetic flux density is rapidly locally fluctuated, and thereby the harmonic flux in the rotary electric machine is generated. The harmonic flux results in not only an increase in stray load loss, but also a decrease in power factor or torque characteristic and an increase in rotor iron loss, and thus the harmonic flux needs to be decreased.

In general, a large rotary electric machine employs the open type (open-slot type), a magnetic wedge obtained by mixing with a magnetic material is applied as a wedge that secures a coil in a stator, and thereby the gap magnetic flux density fluctuation is decreased. On the other hand, in a medium-small rotary electric machine that employs a semi-closed type (semi-open-slot type), it is difficult to perform fitting-in installation of the wedge, and thus it is difficult to apply the magnetic wedge that is applied to the large rotary electric machine, in practice.

For example, as means for solving such a problem, Patent Document 1 discloses a technology in which a fiber-shaped material is mixed with a kneaded material obtained by kneading iron powder and a synthetic resin such that a filling material is formed, an opening of a slot formed in a stator core of a rotary electric machine is filled with the filling material such that the filling material is caused to harden to form a magnetic wedge, and a gap harmonic flux is reduced by the magnetic wedge.

CITATION LIST

Patent Document

Patent Document 1: JP 2002-281709 A

SUMMARY OF THE INVENTION

Problems to be Solved by the Invention

However, in the technology of Patent Document 1, a sufficient effect of reducing the harmonic flux may not be necessarily obtained, and it is not possible to reliably prevent a stray load loss.

An object of the invention is to provide a rotary electric machine that achieves high motor efficiency with little loss.

Solutions to Problems

A preferred embodiment of a rotary electric machine according to the invention includes: a stator core arranged opposing a circumferential surface of a rotor, in which multiple slots provided with openings formed to be open toward the rotor are formed in a circumferential direction; and coils inserted into the slots. A mixture of a soft magnetic powder and a resin material is formed in each of the openings of the slots, and a relative permeability of the mixture is 5 to 35.

A preferred embodiment of a manufacturing method for a rotary electric machine according to the invention which includes a stator core arranged opposing a circumferential surface of a rotor, in which multiple slots provided with openings formed to be open toward the rotor are formed in a circumferential direction, and coils inserted into the slots, the manufacturing method including: mixing a resin material and a soft magnetic powder and forming a mixture; and solidifying the mixture and forming the mixture having a relative permeability of 3 to 35 in each of the openings, the mixture being obtained by mixing the soft magnetic powder and the resin material.

Another preferred embodiment of a rotary electric machine according to the invention includes: multiple teeth that extends from an outer side toward an inner side in a radial direction; a stator core that is provided with a slot formed between the teeth; and a coil that is arranged in the slot. The slot is provided with a housing portion that houses the coil and a slot opening that is positioned closer to an inner diameter side than the housing portion. A magnetic member is in contact with the slot from an inner wall of the slot opening to at least a part of an inner wall of the housing portion.

Effects of the Invention

According to the invention, it is possible to realize a rotary electric machine that achieves high motor efficiency with little loss.

BRIEF DESCRIPTION OF THE DRAWINGS

FIG. 10 is a view illustrating a closely filled structure with spherical particles.

FIG. 11 is a schematic view illustrating a method of a bending test.

FIG. 17 is a perspective view of a magnetic wedge according to Example 5.

FIG. 21 is an enlarged view illustrating the vicinity of a slot opening of a stator core according to Example 7.

MODE FOR CARRYING OUT THE INVENTION

Example 1

Figure 1:
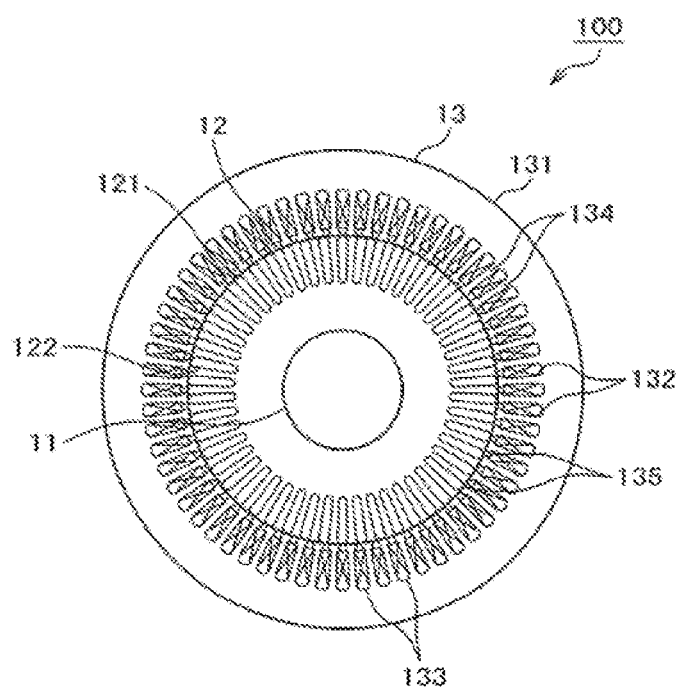
FIG. 1 is a cross-sectional view of a rotary electric machine according to Example 1.
Figure 2:
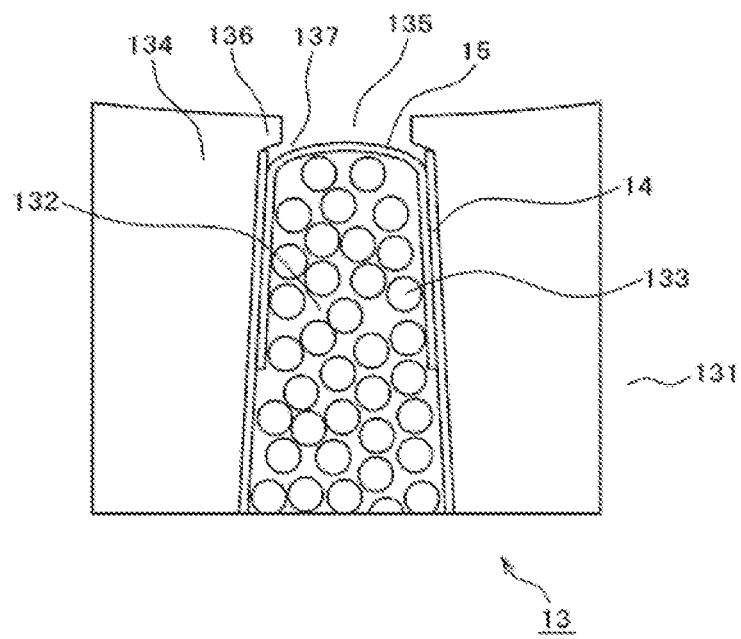
FIG. 2 is an enlarged view illustrating the vicinity of a slot opening of a stator core before a soft magnetic powder/resin mixture is formed.

Hereinafter, Example 1 will be described with reference to FIGS. 1 to 13. As illustrated in FIGS. 1 and 2, a rotary electric machine 100 includes a rotor 12 secured to a rotary shaft (hereinafter, also referred to as a shaft) 11 and a stator 13 installed on an outer side of the rotor 12.

The rotor 12 includes a rotor core 121, which is a stacked core in which electromagnetic steel sheets punched into a predetermined shape are stacked, and a secondary conductor 122 inserted into a slot of the rotor core 121. The rotor core 121 is secured to a rotary shaft 11, and the rotor 12 is provided to be also rotatable along with rotation of the rotary shaft 11.

The stator 13 includes a stator core 131, which is a stacked core in which soft magnetic thin plates such as electromagnetic steel sheets punched into a predetermined shape are stacked, and a coil 133 inserted into a slot 132 of the stator core 131. The stator core 131 is arranged opposing a circumferential surface of the rotor 12. Incidentally, the stacked core that configures the stator core 131 may be a stacked core in which foil members are stacked.

Multiple slots 132 are formed between teeth 134 that radially extend in a radial direction of the rotor 12 from an annular back core provided on an outer circumferential side of the stator core 131 and are formed in a circumferential direction of the stator core 131. The slot 132 is provided with slot opening 135 that is open toward the rotor 12. The slot opening 135 is provided with a protruding portion 136 protruding from an end portion of the teeth 134 on a side of the rotor 12 in the circumferential direction of the stator core 131, and the semi-closed type slot opening is formed (semi-open-slot type).

For example, slot liners 14 and 15 which are formed of polyethylene terephthalate (PET) sheets are installed in the slot 132. The slot liner 14 is installed on an inner wall of the slot 132 so as to be open toward the rotor 12. The slot liner 15 is installed on an inner wall of the slot liner 14 so as to cover an opening of the slot liner 14. The coil 133 is housed in a space surrounded by the slot liners 14 and 15.

For example, the coil 133 is formed by a metal wire formed by coating copper, aluminum, or the like with an insulating material such as enamel, and the coil 133 is disposed in concentric winding, in an example in FIG. 2. The coil 133 and the slot liners 14 and 15 which are installed in the slot 132 are provided in the slot 132 and then are fixed to the stator core 131 through coil connection and a coil end process with fixation varnish such as unsaturated polyester-based varnish. Although not illustrated, the fixation varnish may be used to be interposed between members or may be applied to coat thinly surfaces of the members.

Figure 3:
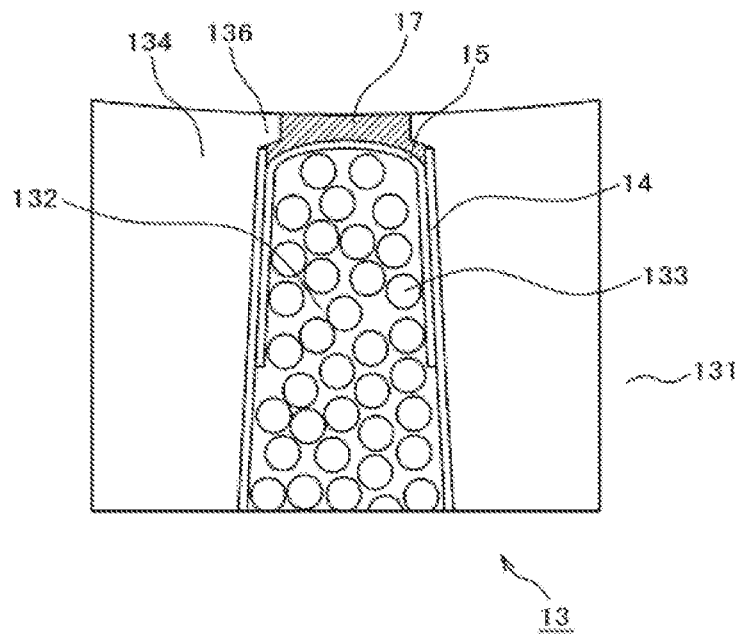
FIG. 3 is a view illustrating a state in which the soft magnetic powder/resin mixture is formed in the slot opening of the stator core illustrated in FIG. 2.

FIG. 3 illustrates a state in which the soft magnetic powder/resin mixture 17 (hereinafter, also referred to as a "mixture") is formed in the slot opening 135 of the stator core 131 illustrated in FIG. 2. As illustrated in FIG. 3, the mixture 17 is formed in the slot opening 135 of the stator core 131 and a gap portion 137 of the slot 132 that is present closer to the side of the rotor 12 than the slot liner 15. The mixture 17 is a hardened body of a mixture of a soft magnetic powder and a resin material, and a forming method thereof will be described below.

Figure 4:
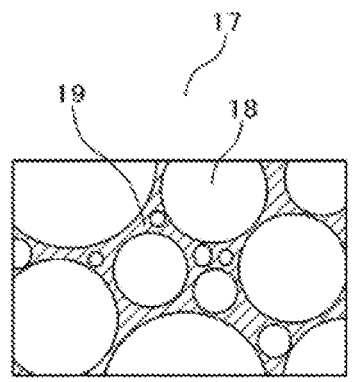
FIG. 4 is a view schematically illustrating an internal structure of the soft magnetic powder/resin mixture.

FIG. 4 is a view schematically illustrating an internal structure of the mixture 17. As illustrated in FIG. 4, an atomized iron powder grain 18 having a substantially spherical shape is dispersed in a silicone resin 19 which is a binder such that the mixture 17 is formed. In a state in which the silicone resin 19 is present between the atomized iron powder grains 18, and an insulator such as a resin is present between the atomized iron powder grains 18 (also referred to as a state in which the atomized iron powder grains 18 are not metallically joined to each other), the mixture 17 is formed.

A relative permeability of the mixture 17 is 5 to 35. The mixture 17 having the relative permeability in a range of 5 to 35 is formed in the slot opening 135. In this manner, it is possible to decrease a loss due to generation of a harmonic flux, and it is possible to obtain a high efficiency improving effect in motor efficiency.

Figure 5:
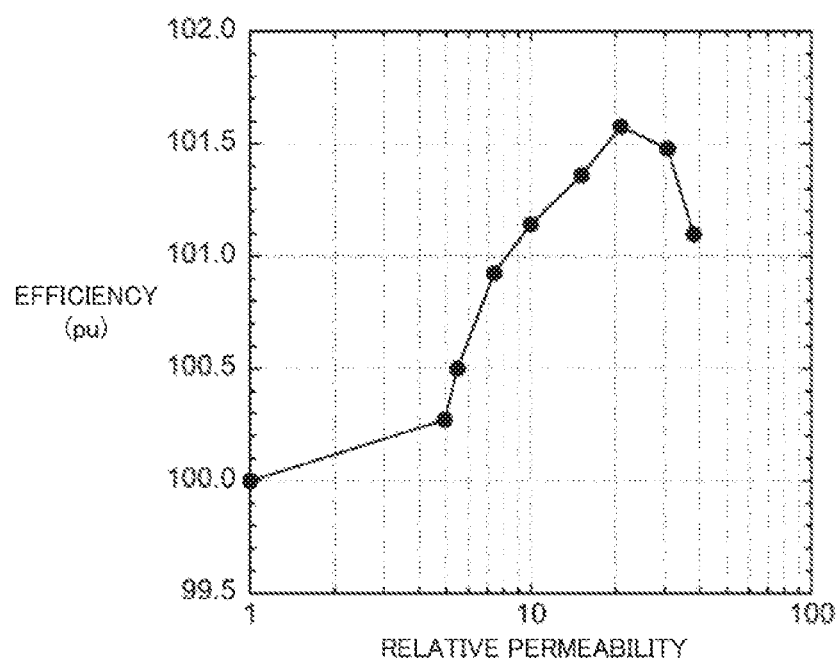
FIG. 5 is a graph showing a relationship between a relative permeability of the soft magnetic powder/resin mixture and motor efficiency of the rotary electric machine.
Figures 6, 7:
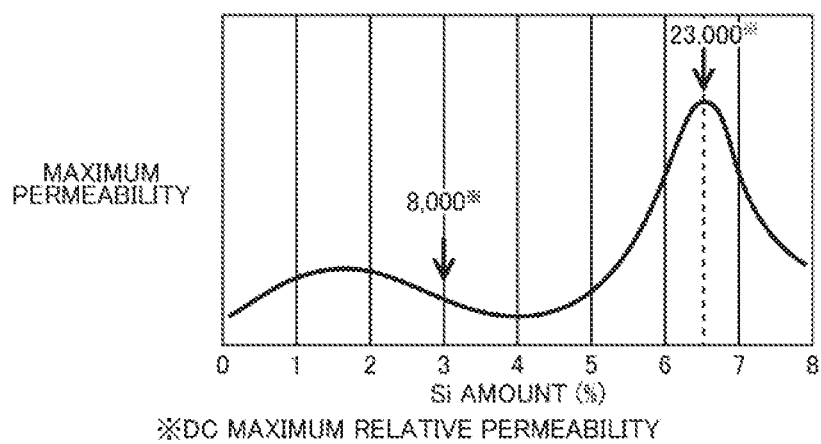
FIG. 6 is a table showing a soft magnetic powder volume ratio and the motor efficiency at measurement points of the relative permeability in the graph shown in FIG. 5.
FIG. 7 is a graph showing a relationship between a permeability and an Si content per unit weight in an Fe—Si alloy.

A relationship between the relative permeability of the mixture 17 and the motor efficiency of the rotary electric machine 100 is verified. Evaluation results are shown in FIGS. 5 and 6. In the verification shown in FIG. 5, an Fe-3 wt % Si alloy powder (hereinafter, an Fe—Si alloy powder will be referred to as an "alloy iron powder") is used as the soft magnetic powder. Specifically, the alloy iron powder and a room temperature vulcanizing silicone resin, which is the resin material, are each weighed such that a volume fraction of the alloy iron powder in the soft magnetic powder/resin mixture after hardening of a resin component becomes a value in FIG. 6, and the mixture of the alloy iron powder and the resin material is kneaded by using a kneader and is prepared. A gas-atomized powder is used as the alloy iron powder (Fe-3 wt % Si alloy powder), and coarse powder having a grain size of larger than 150 μm is removed such that the rest is used.

FIG. 5 is a graph on which motor efficiency is plotted for each relative permeability, the motor efficiency being obtained when a rotary electric machine having the same basic structure as that of the rotary electric machine 100 (three-phase induction motor) illustrated in FIG. 1 is operated at 200 V/50 Hz. In the graph shown in FIG. 5, the horizontal axis represents the relative permeability, the vertical axis represents the motor efficiency, and the horizontal axis is illustrated in a logarithmic display. FIG. 6 shows both the volume fraction of the alloy iron powder in the soft magnetic powder/resin mixtures and the motor efficiency of the rotary electric machine 100, which are plotted on the graph in FIG. 5.

Specifically, stators 13, in which mixtures 17 having the relative permeabilities shown in FIG. 6 are formed as the mixture 17 in the slot opening 135, were prepared, the stators 13 were installed on the rotor 12, and the motor efficiency (output/input power) at the time of operation of the rotary electric machine 100 was measured. A relationship between the relative permeability of the mixture 17 and the motor efficiency was evaluated based on measurement results. Incidentally, the measurement of the motor efficiency was performed by performing replacement of all of the stators 13 on the same rotor 12. The rotor 12 was formed to have a rotor bar in the slot through die cast molding of aluminum, and a rotor having a slot skew by one slot was used. Incidentally, in FIG. 5, motor efficiency of the rotary electric machine 100 is regarded as 100 when the stator 13 in which the mixture 17 is not formed in the slot opening 135 is installed.

In the verification of the graph shown in FIG. 5, a 2.2 kW-output 4-pole three-phase case induction motor (hereinafter, simply abbreviated to an induction motor) was used as the rotary electric machine 100. The stator core 131 and the rotor core 121 were both formed using electromagnetic steel sheets having a thickness of 0.5 mm, and stacked thicknesses of both were 104 mm. Regarding a dimension of the stator core 131, an outer diameter was 175 mm and an inner diameter was 110 mm and, regarding a dimension of the rotor core 121, an outer diameter was 109.4 mm and an inner diameter (shaft hole diameter) was 32 mm. The number of slots of the stator core 131 was 36, and the number of slots of the rotor core 121 was 28. A width of the teeth 134 of the stator core 131 was 5.5 mm, and the entire depth of the slot 132 was 17.8 mm. Regarding a dimension of a region surrounded by the protruding portion 136 of the teeth 134, a width was 3.2 mm, and a depth was 0.8 mm.

The coil 133 was configured using 152 enameled wires, and an outer diameter including an insulation layer of the enameled wire was 0.72 mm. Polyethylene terephthalate (PET) sheets having a thickness of 0.21 mm were used as both the slot liners 14 and 15.

As shown in FIG. 5, each of the rotary electric machines 100 in which the mixtures 17 were formed in the slot opening 135 obtained higher motor efficiency, compared with the rotary electric machine 100 in which the slot opening 135 was not filled with the mixture 17. Data of the rotary electric machine in which the slot opening is not filled with the mixture 17 is data obtained when the relative permeability is 1 in FIG. 5. When the relative permeability of the mixture 17 is 5 or higher, it is possible to obtain a higher improving effect of the motor efficiency, compared with when the relative permeability is lower than 5. In other words, in a case where the relative permeability of the mixture 17 is lower than 5, a degree of improvement in the motor efficiency is small, and it is not possible to obtain efficiency improving effect corresponding to the costs of forming the mixture 17.

On the other hand, when the relative permeability of the mixture 17 is higher than 35, a magnetic flux that flows between the adjacent teeth 134 of the stator core 131 via the mixture 17 (hereinafter, referred to as a "leaking magnetic flux") increases, and a primary copper loss increases. Therefore, the motor efficiency decreases. The relative permeability of the mixture 17 is 35 or lower, and thereby it is possible to suppress an increase in leaking magnetic flux, and it is possible to obtain a high effect of improvement in motor efficiency. Incidentally, when the relative permeability is higher than 40, a proportion of the soft magnetic powder in the mixture 17 becomes very high, and most of the soft magnetic powder grains are metallically joined. Therefore, in Example, data obtained by increasing the relative permeability of the mixture 17 to about 38 is used.

Incidentally, a state in which a molded body made of only the silicon resin without containing the soft magnetic powder is formed in the slot opening 135 is magnetically equivalent to a state in which the slot opening 135 remains as a gap as is. Therefore, in the graph shown in FIG. 5, the state is represented as a case where a mixing amount of the soft magnetic powder is 0, that is, a case where the relative permeability is 1.

Incidentally, the mixture 17 having the volume fractions described above used in the verification in FIG. 5 used the resin material, of which initial viscosity changed depending on a volume fraction of the soft magnetic powder, with consideration for uniformity of distribution of the soft magnetic powder in the resin material and easiness of mixing work during mixing of the soft magnetic powder and the resin material. Specifically, in a case where the soft magnetic powder/resin mixtures having volume fractions of the soft magnetic powder of 40% by volume and 48% by volume were prepared, the silicone resin having the initial viscosity of 70 Pa·s was used. In a case where the soft magnetic powder/resin mixtures having volume fractions of the soft magnetic powder of 54 to 66% by volume were prepared, the silicone resin having the initial viscosity of 20 Pa·s was used. In addition, in a case where the soft magnetic powder/resin mixtures having volume fractions of the soft magnetic powder of 72% by volume or higher were prepared, the silicone resin having the initial viscosity of 1 Pa·s was used.

In Example 1, for example, the slot opening 135 of the stator core 131 and the gap portion 137 of the slot 132 that is present closer to the side of the rotor 12 than the slot liner 15 are filled with a soft magnetic powder/resin mixed substance having a fluidity before the resin material hardens. Subsequently, the resin material contained in the soft magnetic powder/resin mixed substance is caused to harden, and thereby the mixture 17 having the relative permeability of 5 to 35 is formed in the slot opening 135 and the gap portion 137 of the slot 132.

Specifically, the slot opening 135 and the gap portion 137 of the slot 132 are filled with the soft magnetic powder/resin mixed substance obtained by mixing the soft magnetic powder in the silicone resin before the resin material hardens, for example. Subsequently, in order to prevent the soft magnetic powder/resin mixed substance from overflowing to the side of the rotor 12, a pressing die made of Teflon (registered trademark) having a curvature equal to an inner circumferential surface of the stator core 131 is brought into contact with a surface of the soft magnetic powder/resin mixed substance. In this case, the redundant soft magnetic powder/resin mixed substance is discharged from an end portion of the slot 132.

In this state, the soft magnetic powder/resin mixed substance remains for a predetermined time at room temperature, the silicone resin is caused to harden so as to form the mixture 17, and then the pressing die made of Teflon is detached from the surface of the mixture 17. Through an above-described procedure, it is possible to obtain the stator 13 in which the mixture 17 is formed in a gap of the slot 132.

A permeability of the mixture 17 can be adjusted by the volume fraction of the soft magnetic powder in the mixture. The following description of that a magnetic property of the mixture 17 does not depend on a type of soft magnetic powder but depends on the volume fraction of the soft magnetic powder will be provided with reference to FIGS. 7 to 9.

FIG. 7 is a graph illustrating a relationship between an Si content per unit weight and the permeability (DC maximum relative permeability) in the Fe—Si alloy. As shown in FIG. 7, for example, the permeability (DC maximum relative permeability) of an Fe-6.5 wt % Si alloy is about three times the permeability (DC maximum relative permeability) of an Fe-3 wt % Si alloy. Hence, the permeability of the Fe—Si alloy itself depends on an alloy composition.

Figure 8:
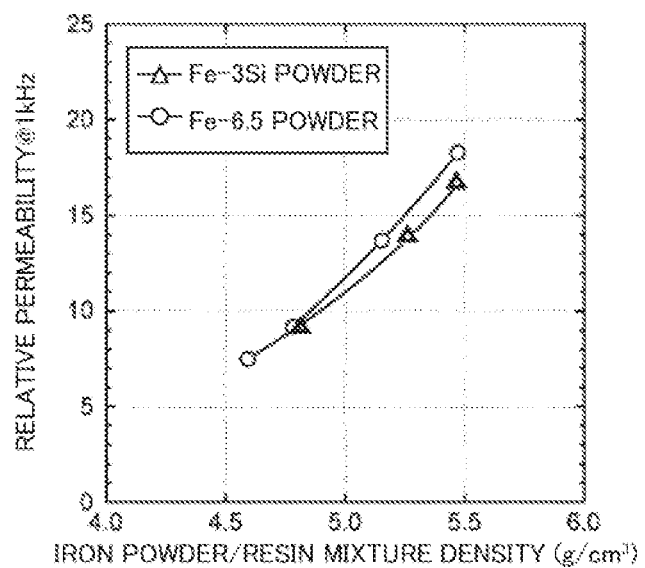
FIG. 8 is a graph showing a relationship between density and the relative permeability of the soft magnetic powder/resin mixture.

Next, a relationship of the relative permeability with respect to the density of the soft magnetic powder/resin mixture obtained by mixing the resin material with each of the Fe-3 wt % Si alloy and the Fe-6.5 wt % Si alloy was verified. Verification results are shown in FIG. 8. Incidentally, FIG. 8 shows a graph obtained by changing the volume fraction of the soft magnetic powder in the soft magnetic powder/resin mixture, and thereby changing the density of the soft magnetic powder/resin mixture.

As shown in FIG. 8, even in a case where either the Fe-3 wt % Si alloy or the Fe-6.5 wt % Si alloy is used, the relative permeability increases along with an increase in density of the mixture; however, a difference between the relative permeabilities between both of the mixtures is small in both types of the density. Hence, a difference in magnetization property between both of the alloys, which is shown in FIG. 7, is little reflected in the mixture 17.

Hence, the magnetization property of the mixture 17 does not depend on the type of soft magnetic powder but depends on the volume fraction of the soft magnetic powder in the mixture. Therefore, any magnetic body to be mixed with the resin material may be used as long as the magnetic body has a soft magnetic property, and it is possible to apply another soft magnetic body other than the Fe—Si alloy thereto. In addition, a mixed substance of a plurality of types of soft magnetic powder may be mixed with the resin material, and an obtained mixture may be used.

Figure 9:
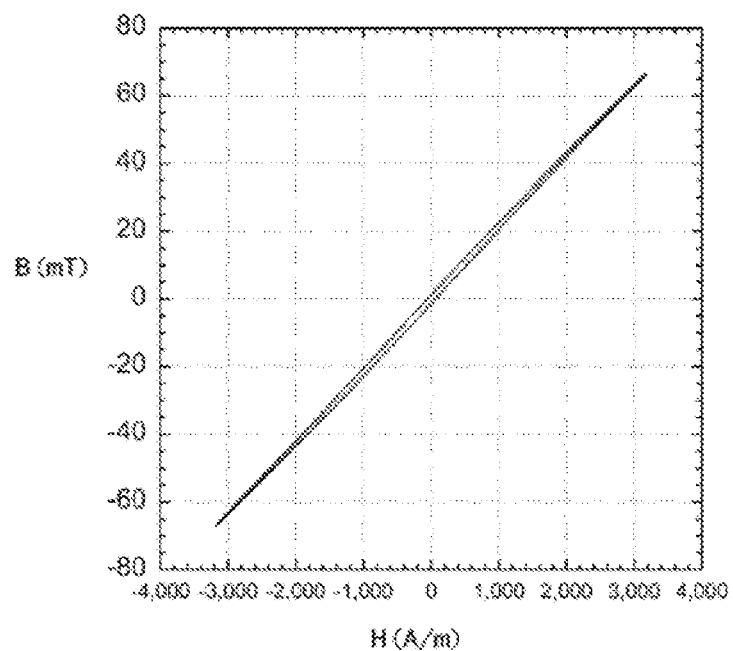
FIG. 9 is a graph showing a magnetization curve of the soft magnetic powder/resin mixture used in verification in FIG. 5.

Next, the magnetization property of the soft magnetic powder/resin mixture will be verified. FIG. 9 illustrates a magnetization curve of the mixture 17 containing 72% by volume of the soft magnetic powder in the mixture 17 used in verification in FIG. 5. Incidentally, the magnetization curve in FIG. 9 illustrates a magnetization curve at 1 kHz of the mixture 17 described above of a ring core molded to have an outer diameter of 30 mm, an inner diameter of 20 mm, and a thickness of 5 mm.

As shown in FIG. 9, a B—H curve of the mixture 17 with a volume fraction of the soft magnetic powder of 72% by volume has a substantially straight line shape, and thus it is possible to confirm that the magnetization property unique to the soft magnetic body has a small influence on the magnetization property of the mixture 17.

In other words, since the resin material which is a nonmagnetic body is interposed between the soft magnetic bodies of the mixture 17 (refer to FIG. 4), an influence of the magnetization property unique to the soft magnetic powder decreases in the mixture 17 due to the resin material. Therefore, the magnetization property of the mixture 17 depends on a distance between soft magnetic powder grains separated by the resin material, that is, the volume fraction of the soft magnetic powder in the mixture 17. Hence, also in this respect, it is possible to confirm that the magnetization property of the mixture 17 does not depend on the type of soft magnetic powder but depends on the volume fraction of the soft magnetic powder in the mixture 17.

From a viewpoint of obtaining the high efficiency improving effect by the installation of the mixture 17, it is preferable that the volume fraction of the soft magnetic powder in the mixture 17 is 50% by volume or higher and 85% by volume or lower.

The volume fraction of the soft magnetic powder in the mixture 17 is set to 50% by volume or higher, thereby it is possible to obtain a high degree of improvement in motor efficiency, and it is possible to obtain the high efficiency improving effect corresponding to the installation costs of installing the mixture 17. In addition, the volume fraction of the soft magnetic powder in the mixture 17 is set to 85% by volume or lower, and thereby it is possible to come into a state in which the soft magnetic powder is dispersed in the resin material without metallic joining of the soft magnetic powder grains to each other. Consequently, it is possible to suppress an increase in leaking magnetic flux flowing through the adjacent teeth 134 via the mixture 17 or an increase in primary copper loss along with the increase in leaking magnetic flux.

In other words, as illustrated in FIG. 10, in a close filling state of spherical particles 21 having the same grain size without a compressive force action for joining of the soft magnetic powder grains to each other, a filling rate is substantially 74% by volume. In a case where spherical particles have a grain size distribution, a void of the spherical particles 21 illustrated in FIG. 10 is filled with the spherical particles having a grain size smaller than the spherical particles 21. Therefore, in a case where the compressive force for joining of the soft magnetic powder grains to each other is not acted, the maximum value of the filling rate of the spherical particles is substantially 85% by volume. Hence, the volume fraction of the soft magnetic powder in the mixture 17 is set to 85% by volume or lower, and thereby it is possible to come into a state in which the soft magnetic powder is dispersed in the resin material without metallic joining of the soft magnetic powder grains to each other. From a viewpoint of obtaining the higher efficiency improving effect, it is preferable that the volume fraction of the soft magnetic powder in the mixture 17 is 55% by volume or higher and 80% by volume or lower.

In Example 1, as described above, the mixed substance of the soft magnetic powder and the resin material is put in the slot opening 135, and then, is solidified, and thus it is possible to form the mixture 17 even without the compressive force action on the mixed substance. Therefore, it is possible to easily obtain the mixture 17 in a state in which the soft magnetic powder is dispersed in the resin material without metallic joining of the soft magnetic powder grains to each other. In this case, the mixture 17 has an electrical insulation property, in principle.

In a case where the rotary electric machine is operated for a long period, when mechanical strength of the mixture 17 is insufficient, local missing of the mixture 17 or a product failure according to the local missing may occur due to application of a suction force from the rotor 12, a fluid friction force along with rotation of the rotor 12, or the like.

Therefore, resistance to mechanical damage such as the local missing was evaluated through the following bending test in the mixture 17 mounted on the rotary electric machine.

As illustrated in FIG. 11, the bending test was conducted by a three-point bending test. Specifically, a sample 33 was placed on fulcrums 32 of a support body 31, a bending load was applied at the center thereof with a distal end of an indenter 34 as a weighted point, and degrees of bending displacement and bending load were measured as time elapses.

As the support body 31, a support body in which a distance between fulcrums 32 was 20 mm and a height of the fulcrum 32 was 6 mm was used. In addition, as the support body 31 and the indenter 34, each of the distal ends of the fulcrum 32 and the indenter 34 had an arc shape having a radius of 4 mm. As the sample 33, a predetermined amount of mixture 17 was put into split molds made of Teflon and hardened so as to be molded to a rectangular parallelepiped having a width of 6 mm, a thickness of 10 mm, and a length of 30 mm. In a process of the bending test, the bending test was conducted in which the maximum displacement of the indenter 34 is 6 mm such that the sample 33 is not brought into contact with a surface of the support body 31 between the fulcrums 32. A reference point (zero point) of the displacement is a starting point of applying the bending load.

Figure 12:
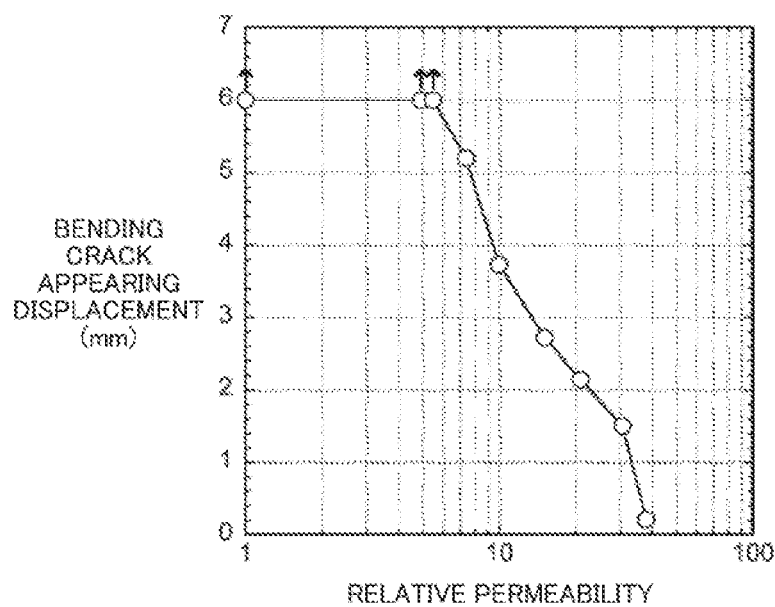
FIG. 12 is a graph showing a relationship between displacement of a distal end of an indenter and the relative permeability at a time point when a crack appears in the soft magnetic powder/resin mixture in the bending test.

FIG. 12 is a graph illustrating a relationship between displacement of the distal end of the indenter 34 and the relative permeability at a time point when a crack appears in the sample 33 in the bending test. As shown in FIG. 12, even when the indenter 34 was displaced by a distance (6 mm) corresponding to the height of the fulcrum 32, no crack appeared in the mixture 17 having the relative permeability of lower than 6. In addition, in the mixture 17 having the relative permeability of 6 or higher, a displacement value of the indenter 34 decreased when crack appeared as the relative permeability increased, and thus it was possible to confirm that ductility of the mixture 17 decreased as the relative permeability increased.

In addition, when compared with a change in bending crack appearing displacement of the indenter 34 in a range of the relative permeability of 7.3 to 31, a degree of decrease in bending crack appearing displacement of the indenter 34 was large when the relative permeability changed from 31 to 38, and a difference therebetween was remarkable. Therefore, the mixture 17 having the relative permeability of 38 was significantly more brittle than the state in which the relative permeability is 31, and thus it was possible to confirm that the crack appeared in a stage immediately after the start of the bending deformation. Incidentally, an upward arrow illustrated in an upper portion of a plot in FIG. 12 indicates that a displacement amount when the crack appears is 6 mm or longer.

Figure 13:
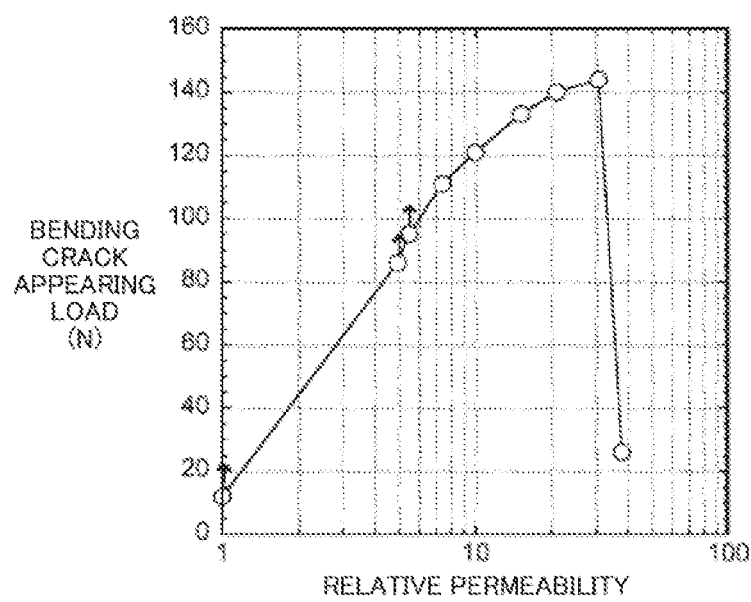
FIG. 13 is a graph showing a relationship between a bending load and the relative permeability when the crack appears in the soft magnetic powder/resin mixture in the bending test conducted in FIG. 12.

FIG. 13 is a graph illustrating a relationship between the bending load and the relative permeability when the crack appears in the sample 33 in the bending test conducted in FIG. 12. As described in FIG. 12, in the mixture 17 having the relative permeability of lower than 6, the bending crack does not appear. Therefore, in FIG. 13, the bending load of each plot when the relative permeability is lower than 6 shows a value at the time point when the indenter 34 is displaced by 6 mm.

As shown in FIG. 13, the bending load when the crack appeared increased as the relative permeability increased; however, the bending load sharply decreased in the mixture 17 having the relative permeability of 38, and it was possible to confirm that the mechanical strength significantly decreased.

A reason that the mechanical strength of the mixture 17 having the relative permeability of 38 decreased is estimated because a mixing amount of the soft magnetic powder with respect to the resin material is too much, a region that is not filled with the resin material between the soft magnetic powder grains is formed, and many voids which are starting points of the bending cracks are generated.

From results of the bending test described above, the mixture 17 having the relative permeability of 38 or higher had the low mechanical strength and was brittle. Therefore, in a case where the rotary electric machine was operated for a long period, it was confirmed that the local missing of the mixture 17 easily occurs, and it was difficult to use the machine in practical use. From the results described above, regarding the mixture 17, from the viewpoint of the efficiency and the viewpoint of the mechanical strength, the relative permeability of the mixture 17 is preferably 5 or higher and 35 or lower.

For example, it is possible to appropriately use a gas-atomized powder as the soft magnetic powder. The gas-atomized powder is the substantially spherical powder and, thus, is highly easy to be kneaded or mixed with the resin material and has high uniformity of the mixed substance. However, the soft magnetic powder does not absolutely need to have the substantially spherical shape and may be a reducing powder, a crushed powder, or the like, for example. In this case, a kneading condition or an agitating condition is adjusted depending on the shape of the soft magnetic powder, and thereby it is possible to appropriately use the powders.

Incidentally, the mixture 17 used in the measurement in the graph shown in FIG. 5 has high adhesiveness to the alloy iron powder of the silicone resin, and thus a surface treatment is not performed on the alloy iron powder. However, in order to improve the adhesiveness of the soft magnetic powder to the resin material, an appropriate surface treatment of the soft magnetic powder may be performed with a surface treatment agent such as a silane coupling agent depending on the type of the resin material or the soft magnetic powder. The surface treatment is performed on the soft magnetic powder such that the adhesiveness to the resin material improves, and thereby it is possible to improve the mechanical properties of the mixture.

Example 2

Figure 14A:
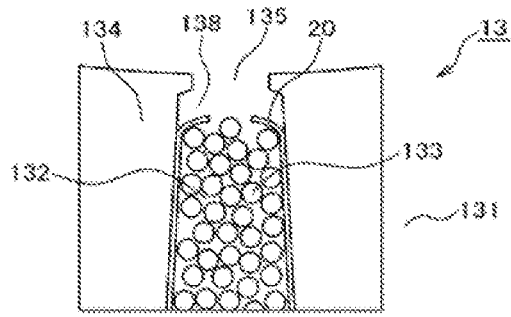
FIGS. 14A-14C are views illustrating a process of forming a soft magnetic powder/resin mixture according to Example 2.
Figure 14B:
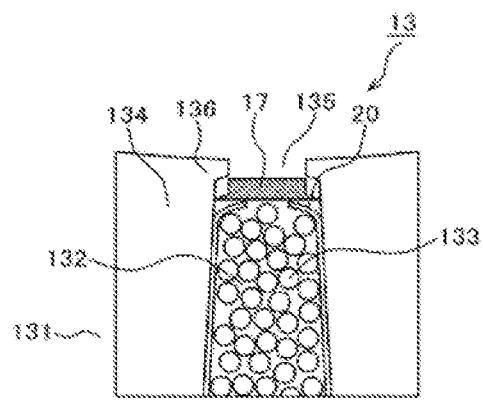

Hereinafter, a manufacturing method for the rotary electric machine according to Example 2 will be described with reference to FIG. 14. Example 2 is an embodiment in which the mixed substance of the soft magnetic powder and the resin material is solidified in advance so as to become the mixture 17 having stiffness and, then, is mounted in the slot opening 135. Incidentally, the rotary electric machine that is applied in Example 2 has the same configuration as that of the rotary electric machine 100 that is applied in Example 1, except that the slot liner has a different shape and is installed in a different manner.

First, after the soft magnetic powder and the resin material are mixed, and the mixed substance thereof is molded into a fittable shape into the slot opening 135, the resin material contained in the mixed substance is solidified such that the mixture 17 is formed. Subsequently, while the coil 133 is inserted into the slot 132 and is pushed toward a bottom portion side of the slot 132, an end portion of the slot liner 20 on the side of the rotor 12 is bent toward the center side of the slot 132 (refer to FIG. 14(a)).

Next, the mixture 17 is inserted into a gap portion 138 formed between the slot opening 135 and the coil 133. The mixture 17 is pressed toward the slot opening 135 due to a springback of the end portion of the slot liner 20 and is lightly pressed to be secured by the protruding portion 136 of the teeth 134 of the stator core 131 (refer to FIG. 14(b)).

Subsequently, coil end compressing process is performed on the coil 133 inserted into the slot 132. In this case, the coil 133 pressed to the bottom portion of the slot 132 moves toward the slot opening 135, and the mixture 17 is fitted into the slot opening 135 (refer to FIG. 14(c)).

Finally, the coil 133 and the slot liner 20 are fixed to the stator core 131 by using unsaturated polyester-based varnish, and the mixture 17 is fixed to the stator core 131. Consequently, in a state in which a gap that influences the magnetic property in the slot opening 135 of the stator core 131 is very small, it is possible to mount the mixture 17.

Hereinafter, a manufacturing method for the rotary electric machine according to Example 2 will be specifically described. In the following description, a mixture 17 obtained by mixing and hardening of an Fe-3 wt % Si alloy gas-atomized powder, which is the soft magnetic powder, and epoxy resin, which is the resin material, was used as the mixture 17.

In Example 2, first, the mixture 17 is formed into a shape with which it is possible to fill the slot opening 135 including a region surrounded by a tapered portion of the protruding portion 136 of the teeth 134 of the stator core 131. Consequently, it is possible to position the mixture 17 in the slot opening 135. Specifically, after a stainless steel mold (split mold) provided with a groove having a length of 104 mm was filled with the soft magnetic powder/resin mixed substance, an open plane of the groove was closed by a stainless steel jig having a curvature equal to that of the inner circumferential surface of the stator core 131, and the resin in the soft magnetic powder/resin mixed substance hardened such that the mixture 17 was formed.

In the stainless steel mold, after a silicone resin-based releasing agent was applied on a contact surface with a filling material and a split surface of the mold (split mold), the mixed substance subjected to a defoaming treatment was poured therein. Consequently, the mixture 17 after the epoxy resin hardened was able to be easily taken out from the stainless steel mold.

The mixture 17 had a cross section formed to be slightly smaller than a cross sectional area of a region of the slot 132 in which the mixture was to be mounted. Specifically, in the rotary electric machine used in the verification, since a width of the slot opening 135 of the stator 13 was 3.2 mm, a groove width of a portion corresponding to the slot opening 135 of the stainless steel mold (split mold) was 3.1 mm such that an insertion gap having a size of 0.05 mm on one side was formed between the mixture 17 to be obtained and the slot opening 135. Consequently, the mixture 17 was prevented from being damaged when the mixture was fitted into the slot opening 135.

The mixture 17 was formed by mixing the Fe-3 wt % Si alloy gas-atomized powder and epoxy resin such that the volume fraction of the soft magnetic powder was 72% by volume. Two-component resin having the viscosity of 0.6 Pa·s at room temperature was used as the epoxy resin and was mixed with the soft magnetic powder by using an agitator. After mixing by the agitator, the defoaming treatment of the mixed substance was performed in a low pressure chamber by a rotary pump. The defoaming treatment performed mixed substance was poured into the stainless steel mold described above, was heated for two hours at 100° C., then, for four hours at 175° C. such that the epoxy resin in the mixed substance hardened.

Incidentally, for example, regarding a fitting-in magnetic wedge of the large rotary electric machine, the magnetic wedge is inserted to be mounted in the slot 132 of the stator 13 in an axial direction of the rotary shaft 11, and thus it is necessary to provide a gap having a certain size between the magnetic wedge and the slot 132. By comparison, in the manufacturing method for the rotary electric machine of Example 2, the mixture 17 is moved in a radial direction of the stator 13, thereby, being mounted in the slot opening 135. Hence, compared with when the magnetic wedge is mounted in the large rotary electric machine described above, it is possible to mount the mixture 17 in the slot 132 with a short moving distance. Therefore, compared with when the magnetic wedge is mounted in the large rotary electric machine, it is possible to more significantly decrease the insertion gap, and it is possible to more decrease a loss of the magnetic effect of the mixture 17.

According to Example 2, it is possible to easily and efficiently manufacture the stator 13 having the mixture 17. Incidentally, in the rotary electric machine using the stator 13 obtained by the manufacturing method of Example 2, the motor efficiency is not measured; however, even in the rotary electric machine using the stator 13 obtained by the manufacturing method of Example 2, it is estimated that it is possible to achieve substantially the same motor efficiency improving effect as when the volume fraction of the soft magnetic powder in the mixture 17 is 72% by volume in the rotary electric machine using the stator 13 obtained by the manufacturing method of Example 1.

In the manufacturing method for the rotary electric machine of Example 2, the mixture 17 solidified in advance is mounted in the slot opening 135. Therefore, it is possible to install the mixture 17 (refer to FIG. 14) without installing the slot liner 15 (refer to FIG. 2) on the side of the slot opening 135 that is installed in Example 1.

Figure 14C:
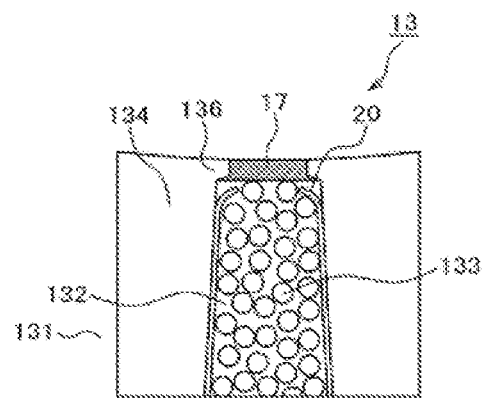

Incidentally, in an example illustrated in FIG. 2, the slot liner 15 has a function of securing insulation property between the coil 133 and the stator core 131. As illustrated in FIG. 14(c), in a case where the slot liner 15 on the side of the rotor 12 is not installed, the mixture 17 also has the function of securing the insulation property between the coil 133 and the stator core 131.

As described in FIG. 9, even when an alternating field of 1 kHz is applied, an increase in hysteresis due to eddy current is not observed, but the mixture 17 as a type of mixture 17 is observed substantially as an insulator. Therefore, it is possible to secure the electrical insulation property between the coil 133 and the stator core 131 by the mixture 17.

However, in a case where a content of the soft magnetic powder is high in the mixture 17, and the electrical insulation property as the mixture is low, an insulating resin sheet may adhere to a surface of the mixture 17 on the side of the bottom portion of the slot 132, or an insulating resin sheet may be inserted between the mixture 17 and the coil 133.

It is possible to use another resin other than the silicone resin or the epoxy resin as the resin material, as long as the resin material can infiltrate between the soft magnetic powder so as to hold the soft magnetic powder in the mixture 17, and the resin material has the electrical insulation property. However, the resin material may be selected with consideration for heat emission due to a loss during a motor operation or heat resistance with respect to an increase in temperature of the stator core 131 or the coil 133 in response to the heat emission.

In Example 2, the epoxy resin used as the resin material is a thermosetting resin and is known to cause a significant decrease in viscosity in a thermosetting process. When the viscosity of the resin material remarkably decreases, the resin material having low viscosity flows in a joining interface of the stainless steel mold (split mold) during the thermosetting process. In this case, a mixing ratio of the soft magnetic powder/resin mixed substance in the mold changes, and the soft magnetic powder/resin mixed substance having the desired magnetic property may be not obtained. Therefore, in a case where a thermosetting resin or a resin having low viscosity is used, or in a case where the soft magnetic powder/resin mixed substance having low mixing ratio of the soft magnetic powder is molded as necessary, in order to suppress flowing away of resin components from the soft magnetic powder/resin mixed substance, fine ceramic powder such as alumina or silica may be appropriately mixed with the resin material, and the resin material may be used as a filling material and may harden in a state in which a space between powder particles is minimized with the ceramic powder.

Example 3

Figure 15:
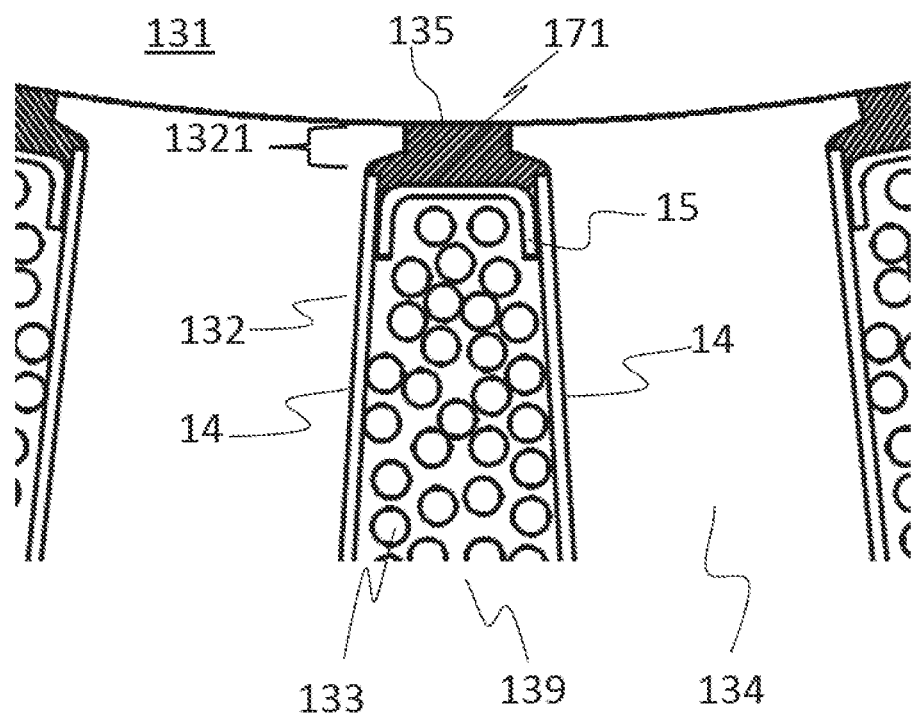
FIG. 15 is an enlarged view illustrating the vicinity of a slot opening of a stator core according to Example 3.

FIG. 15 is an enlarged view illustrating the vicinity of the slot opening of the stator core.

The slot liner 14 which is an insulator, the coil 133, and the slot liner (or a slice) 15 which is an insulator, are inserted from the outer circumferential side and housed in a housing portion 139 of the slot 132 of the stator core 131. The slot liner 14 on the outer circumferential side insulates a space between the coil 133 and the teeth 134. In addition, the slot liner 15 on the inner circumferential side plays a role of insulation and another role of preventing the coil 133 from projecting from the end portion of the slot opening 135 toward the rotor core. For example, the coil 133 is a coil obtained by winding a conductor like enamel-coated copper wire around the teeth 134.

Regarding a shape of the slot 132 of the stator core 131 that is provided with the slot opening 135 along an inner diameter of the stator core, the large rotary electric machine mainly uses a completely opened type (open) slot, and a medium-small rotary electric machine uses the semi-opened type (semi-closed) slot. In addition, the teeth 134 are present between the slot of the stator core and the slot. In the opened type slot shape, sparseness/density (slot ripple) of magnetic flux density occurs due to a difference between the magnetic permeability of the electromagnetic steel sheet of the teeth 134 and magnetic permeability of the slot opening 135 of the stator core. The harmonic flux occurs in the slot opening 135 due to the slot ripple, and an iron loss or a copper loss occurs at a position close to a surface of the rotor core 121 on the side of the stator core. In order to suppress the harmonic flux, it is necessary to shorten an equivalent gap length between the stator core and the rotor core. The equivalent gap length is shortened, and thereby Carter's coefficient decreases. As a result, the short equivalent gap length contributes to a reduction in harmonic flux.

Thus, as illustrated in FIG. 15, Example is characterized by a structure in which a space from the slot opening 135 to an upper portion 1321 of the housing portion 139 of the slot 132 is filled with a magnetic wedge 171. Filling with an inner circumferential surface of the magnetic wedge 171 is performed to a position that is coincident with the inner circumferential surface of the stator core 131. Although not illustrated in the drawing, with the magnetic wedge 171, filling with an end portion of the magnetic wedge 171 in the axial direction is also performed to a position that is coincident with the end portion of the stator core. In addition, the magnetic wedge 171 also is in contact with a side wall of the housing portion 139 (slot liner 14 on both sides in the example illustrated in the drawing) having an angle that changes from an angle of the side wall of the slot opening 135, in addition to the side wall of the slot opening 135. In this manner, the magnetic wedge 171 is present to the housing portion 139 having a width wider than that of the slot opening 135 in the circumferential direction, and thereby a portion of the magnetic wedge 171, which is formed in the housing portion 139, is caught when the magnetic wedge is drawn to the inner diameter side by a magnetic suction force. Therefore, in the structure, the magnetic wedge 171 is prevented from having a locally missing part due to the magnetic suction force applied to the inner diameter side of the stator core from the rotor core.

The magnetic wedge 171 is a magnetic member similar to the mixture 17 in Example 1, and the magnetic wedge 171 is obtained by kneading a resin and a magnetic powder of iron or the like, filling with a kneaded substance is performed, hardening is performed with heat, and thereby molding is performed. The magnetic powder mainly plays a role of improving the magnetic property, and the resin material functions as a binder that causes the magnetic powder grains to adhere to each other. The resin material is mixed, and thereby the strength of the magnetic wedge is secured.

An end surface of the magnetic wedge 171 in the radial direction is present at a position that is coincident with the inner circumferential surface of the stator core 131, and thereby it is possible to enhance the magnetic property. As described above, this is an effect of shortening of the equivalent gap length. Further, filling with the magnetic wedge 171 is preformed such that the magnetic wedge is in contact with the entire side wall of the slot opening 135, and thereby it is possible to prevent a gap between the magnetic wedge 171 and the electromagnetic steel sheet from being generated. Therefore, the magnetic property is enhanced. In addition, a thickness of the slot opening 135 in the radial direction is caused to match a thickness of the magnetic wedge 171 in the radial direction, and thereby it is possible to realize the magnetic wedge having high effect.

Incidentally, the magnetic wedge 171 is formed using a thermosetting material in Example. Conversely, the wedge may be formed using a material having a property of hardening when being cooled may be used. When the material causes an irreversible change, the material does not return to a liquid phase during the operation of the rotary electric machine, and thus the material can be used as the magnetic wedge. In addition, Example can also be applied to both the semi-closed type slot and the completely-opened type slot.

By using the magnetic wedge 171 of Example, the sparseness/density of magnetic flux density generated by a difference in magnetic permeability between the teeth and the opening of the stator core is canceled, and thereby it is possible to supply further highly efficient rotary electrical power, while a current state is maintained. In addition, since it is possible to realize the example without forming a special groove, special opening shape, or the like in the slot opening 135, it is easy to perform manufacturing.

In addition, since there is an effect of decreasing the excitation current, it is possible to suppress degradation of a starting up current or property degradation such as the degradation of the power factor, which occurs by an increase in coil occupancy rate or an increase of the conductor cross-sectional area in a high efficiency element. Further, the sparseness/density of the magnetic flux density is canceled, and thereby it is possible to prevent magnetic noise, and it is possible to prevent torque ripple.

Example 4

Figure 16:
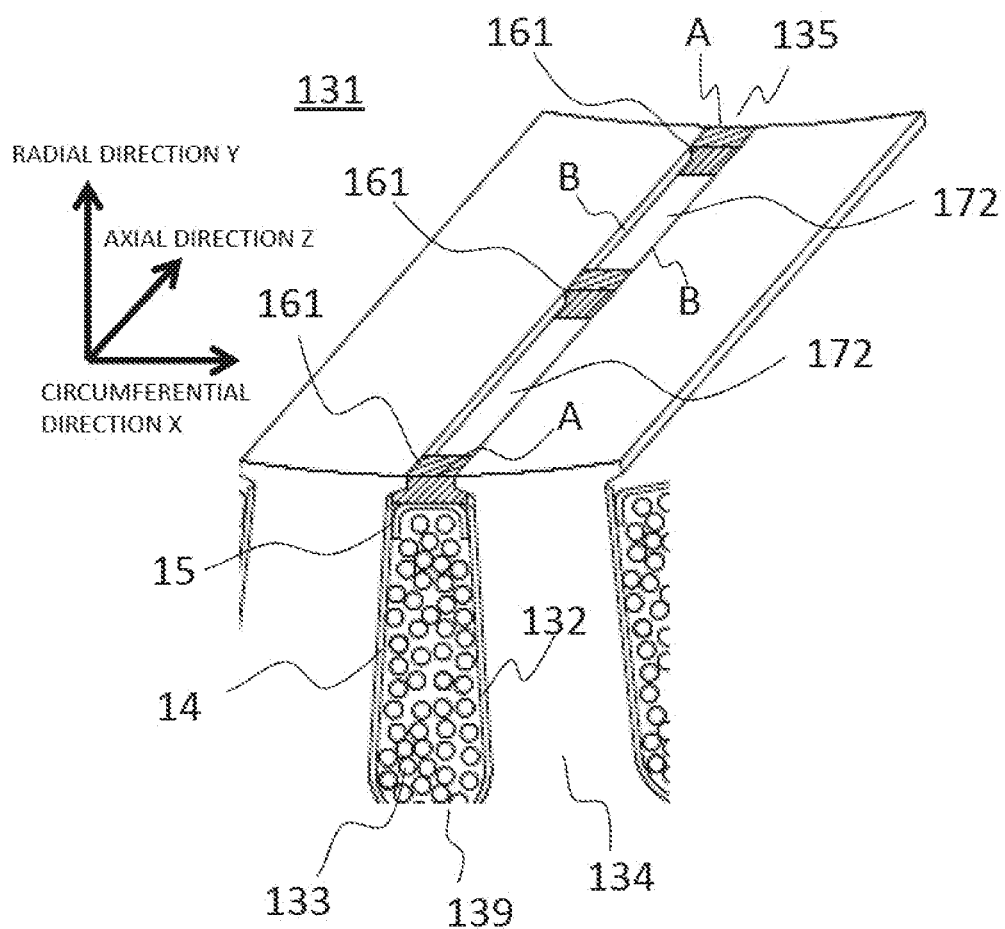
FIG. 16 is a perspective view of a stator core according to Example 4.

Example 4 is described with reference to FIG. 16. FIG. 16 is a perspective view of the stator core and also illustrates a cross section of the housing portion 139 of the slot 132.

Example 4 describes a characteristic of a structure of the slot opening 135 of the stator core 131 in the axial direction (Z direction in FIG. 16). In the configuration, multiple magnetic members 161 are disposed at predetermined intervals in an axial direction Z of the slot opening 135, and spaces between the magnetic members 161 are filled with a magnetic material 172 obtained by kneading the magnetic powder and the resin. The magnetic material 172 is a magnetic member similar to the magnetic wedge described above. Here, the magnetic member 161 is a solid object formed by matching the shape of the slot opening 135 and hardening in advance, and is a guide member or a support member which is filled with the kneaded magnetic material 172. The magnetic member 161 may be called a jig from a viewpoint of a working step. Incidentally, FIG. 16 illustrates a state in which the multiple magnetic members 161 are installed in the slot opening 135; however, the slot opening is not yet filled with the magnetic material 172. Incidentally, in terms of a relationship in Example 5 or Example 6 to be described below, Example 4 is an example in which the magnetic wedge is configured of multiple layers of magnetic members in the axial direction Z.

In the method of filling the slot openings 135 with the magnetic material obtained by kneading of the magnetic body and the resin and molding the magnetic wedge 171 described in Example 1, the viscosity of the resin becomes lower than the viscosity at a normal room temperature by the heat when the magnetic material is heated and hardens, and thereby there is a concern that the resin will leak out from an end portion A in the axial direction or an end portion B of the slot opening 135. In particular, regarding the epoxy resin having high strength, when the temperature exceeds the glass-transition temperature, a state change occurs, and a risk such as a decrease in hardness occurs.

In addition, the slot liner 15 that is present on the inner diameter side of the slot 132 is bent in the axial direction Z and projects toward the slot opening 135, in some cases. The slot liner 15 which is an insulator projects toward the slot opening 135, and thereby, the slot liner 15 prevents the magnetic material from approaching the housing portion 139, and there is a concern that a magnetic wedge having a structure in which suppress by the side wall of housing portion 139 does not have an effect will be formed. In a structure in which the magnetic wedge having a structure in which the suppress does not have an effect is joined only to the side wall of the slot opening 135, it is not possible to secure sufficient strength to withstand the magnetic suction force from the rotor core because attachment strength to the side wall is required, in some cases. As a result, the local missing of the magnetic wedge from the slot occurs, and a problem arises in that it is not possible to secure reliability of a product.

Thus, in Example, the magnetic members 161 of the solid object are arranged at predetermined intervals at multiple positions including the end portion A in the axial direction, in the slot opening 135 in the axial direction Z, and then filling with the magnetic material 172 that forms the magnetic wedge is performed. Consequently, the unhardened magnetic material 172 is prevented from leaking out from the end portion A in the axial direction. Further, since the slot liner 15 that is pushed to the slot opening 135 by the tension of the coil 133 in the housing portion 139 can be held on the side of the housing portion 139 by the magnetic member 161, it is easy to perform filling with the magnetic wedge (for convenience, represented by 172') that is formed by the magnetic material 172 further to the slot liner 15 of the slot 132, compared with Example 1.

In addition, the magnetic member 161 is made of the same material as that of the magnetic wedge 172' or an amount of a material having similar magnetic permeability to that of the magnetic wedge, and the magnetic member 161 can be remained in the slot opening 135 as a jig used in the working process of filling with the magnetic material 172 without being removed even after the magnetic wedge 172' is hardened.

Example 5

Example 5 is described with reference to FIGS. 17 to 19.

A magnetic wedge 173 formed of a multi-layer structure that is prepared by kneading and molding-hardening of the magnetic powder and the resin is inserted into the slot opening 135 and the housing portion 139 from the end portion in the axial direction, and thereby, Example 5 configures a stator core similar to the Example 1.

Similarly to the method illustrated in FIG. 14, the molded magnetic wedge 173 is inserted into the slot opening 135 and the housing portion 139 such that the stator core is prepared. In a case where the stator core is prepared using the molded magnetic wedge, and a stator core having a long dimension in the axial direction is realized in which time and effort are taken to perform filling of the liquid-phase magnetic material, it is possible to improve the working efficiency. Moreover, a magnetic property is applied to a portion in which the magnetic property is needed using the magnetic wedge having the multi-layer structure, and mechanical strength can be applied to a position that needs mechanical strength.

Hereinafter, specific description is provided.

With reference to FIGS. 17 and 18, the magnetic wedge 173 prepared by kneading, molding, and hardening of the magnetic powder and the resin in advance forms a two-layer structure of a first layer 1731 and a second layer 1732 in a radial direction Y. The first layer 1731 that is positioned on the inner diameter side is a layer having density of the soft magnetic powder which is higher than density of the resin, and the second layer 1732 that is positioned on the outer diameter side is a layer having density of the resin which is higher than density of soft magnetic powder. The density of the magnetic powder is higher; however, since the magnetic permeability is high, the mechanical strength decreases because a coupling strength between the magnetic powder grains to each other. In order to prevent the mechanical strength from decreasing, the magnetic powder density is decreased, and thereby it is possible to improve mechanical strength such as the bend strength of the resin because a force for adhesion of the magnetic powder grains to each other is high. Thus, in Example, a plurality of structures are formed, and the first layer and the second layer have different density of magnetic powder from each other, and thereby it is possible to apply high magnetic property in a portion in which the magnetic property is needed, and it is possible to supply the magnetic wedge having high mechanical strength at a position that needs the mechanical strength.

Figure 18A:
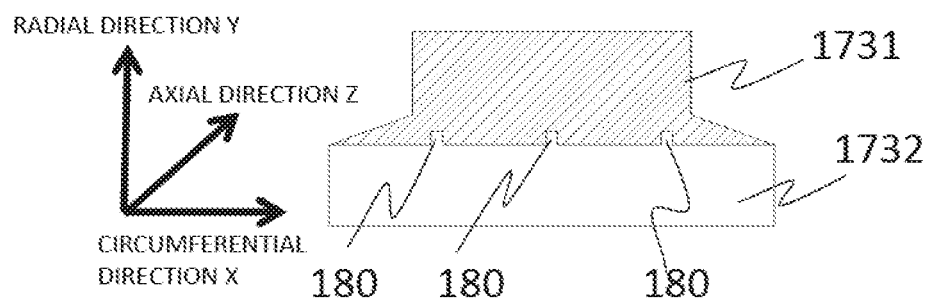
FIGS. 18A-18C are cross-sectional views illustrating a layer structure of the magnetic wedge according to Example 5.
Figure 18B:
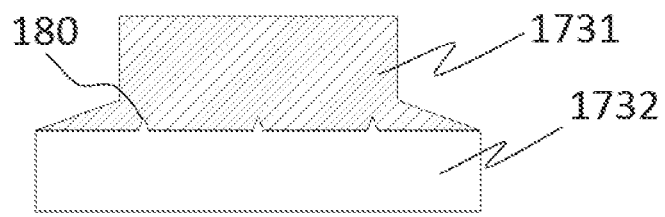
Figure 18C:
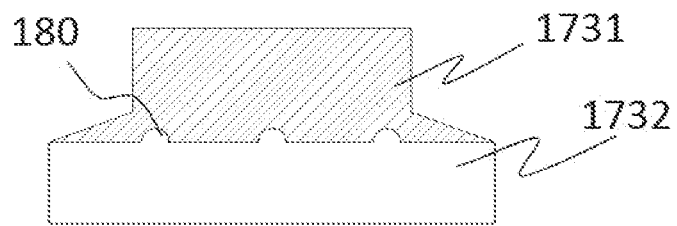

In Example, a protrusion 180 is provided in order to enhance the adhesion strength of adhering surfaces (boundary surface) of the first layer 1731 and the second layer 1732. The protrusion 180 has various shapes, and it is possible to form a quadrangular protrusion as illustrated in FIG. 18A, a conical protrusion as illustrated in FIG. 18B, and a spherical protrusion as illustrated in FIG. 18C, for example. Here, the boundary surfaces illustrated in FIGS. 18A and 18B are provided with protrusions 180 that are each formed to extend toward the first layer 1731 from the second layer 1732; however, the protrusion in FIG. 18C projects from the first layer 1731 toward the second layer 1732 in a reverse manner. It is possible to achieve the same effect by any shape. Positions and the number of protrusions 180 are not particularly limited; however, it is more desirable that the multiple protrusions are provided in the axial direction or in the circumferential direction from a viewpoint of increasing adhesion strength of the first layer and the second layer, compared with a case where only one protrusion is provided.

FIG. 9 illustrates another example of a joining structure of the first layer 1731 and the second layer 1732.

Figure 19A:
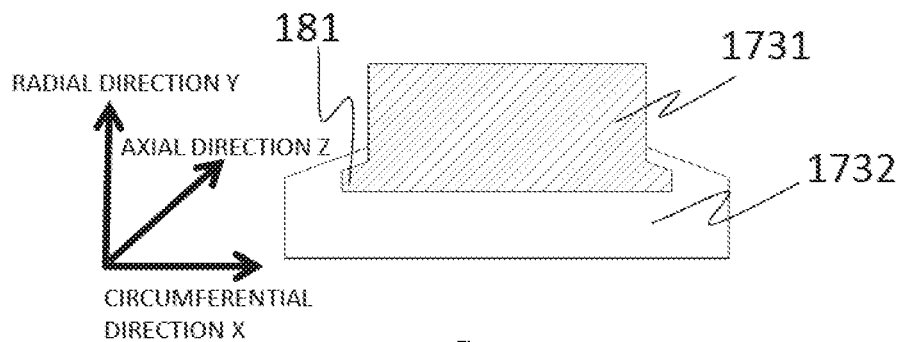
FIGS. 19A-19C are cross-sectional views illustrating the layer structure of the magnetic wedge according to Example 5.
Figure 19B:
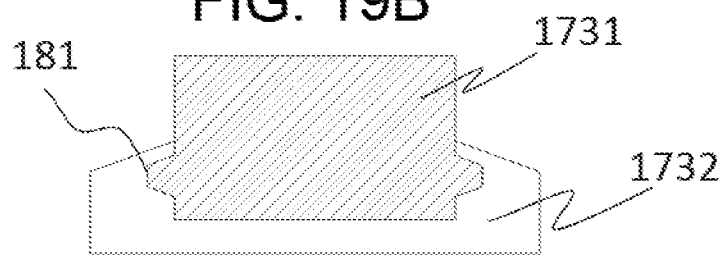
Figure 19C:
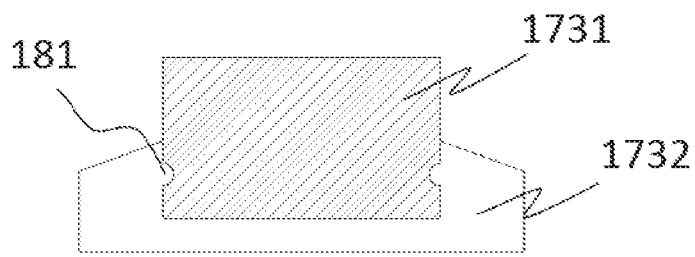

An example in FIG. 9 illustrates a configuration in which the second layer 1732 is formed to cover a lower portion of the first layer 1731 stacked in the radial direction, and both layers meshes each other by the protrusion 181 that projects from a circumferential direction X on both adhering surfaces. In FIGS. 19A and 19B, the protrusion 181 is formed from the first layer 1731 to the second layer 1732, and in FIG. 19C, the protrusion 181 is formed from the second layer 1732 to the first layer 1731 in a reverse manner. In this manner, a structure that withstands the magnetic suction force that is applied inward in the radial direction is achieved.

Incidentally, since the material of the first and second layers 1731 and 1732 of magnetic wedge is the kneaded substance of the resin and the magnetic powder, it is possible to perform molding using a method that is used in molding of plastic such as compression molding or transfer molding, for example.

Next, a modification example of Example 5 and other examples will be described.

Molding of the magnetic wedge 173 formed of the multi-layer structure may not be performed by molding/hardening in advance, but can also be realized in a manufacturing process through a filling method. For example, the slot opening 135 is filled with the kneaded substance of the magnetic powder and the resin, which forms the second layer 1732, first, the kneaded substance is caused to harden, and then filling of the kneaded substance of the magnetic powder having the high magnetic property and the resin, which forms the first layer, is performed on the second layer 1732, and the kneaded substance is caused to harden. In this manner, it is possible to form the multi-layer magnetic wedge 173 during the manufacturing process. In addition, as another example, after the insulation layer (corresponding to the second layer) molded in advance is inserted into the slot opening in advance, the slot opening is filled with the kneaded substance (corresponding to the first layer) having high magnetic property, the kneaded substance is caused to harden, and thereby it is possible to form the same magnetic wedge 173.

Incidentally, examples in FIGS. 17 to 19 are examples in which the magnetic wedge 173 is realized to have a two-layer structure; however, the layer structure is not limited to two layers, and the layer structure may have three or more layers. In a case where the layer structure has three or more layers, the stator core needs high insulation property, and it is also possible to achieve an operation effect of the slot liner 15 by forming the outermost layer in the radial direction is formed of only resin. In this manner, while the number of component members decreases, it is possible to increase the insulation property between the coil 133 and the magnetic wedge 173. Incidentally, the second layer 1732 of the two-layer structured magnetic wedge is also formed of the insulating resin, and thereby it is possible to expect the same operation effect as the outermost layer (functioning as the slot liner) having the three-layer structure described above.

As means for realizing the magnetic wedge having a layer structure with three or more layers, in addition to an example in which the magnetic wedge prepared by hardening in advance is mounted in the slot opening 135, it is possible to repeat filling and hardening of the kneaded substance of the magnetic powder and the resin in order, the kneaded substance forming each layer from an n-th layer to the first layer, and to form the magnetic wedge having a multiple n-layer (n is three or more) structure, in a process of forming the magnetic wedge in the slot opening 135. In addition, it is possible to form the magnetic wedge prepared by collective hardening of the n-th layer to an m-th layer (m is (n−1) to 2) is mounted in the slot opening 135, and filling and hardening of the kneaded substance of the magnetic powder and the resin from the remaining (m−1) layer to the first layer in this order.

Further, as another modification example, the magnetic wedge 173 described above is formed of a multi-layer structure that is stacked in a radial direction Y; however, the direction of the layer structure is not limited to the radial direction can be any direction of the axial direction or the circumferential direction.

Example 6

Figure 20:
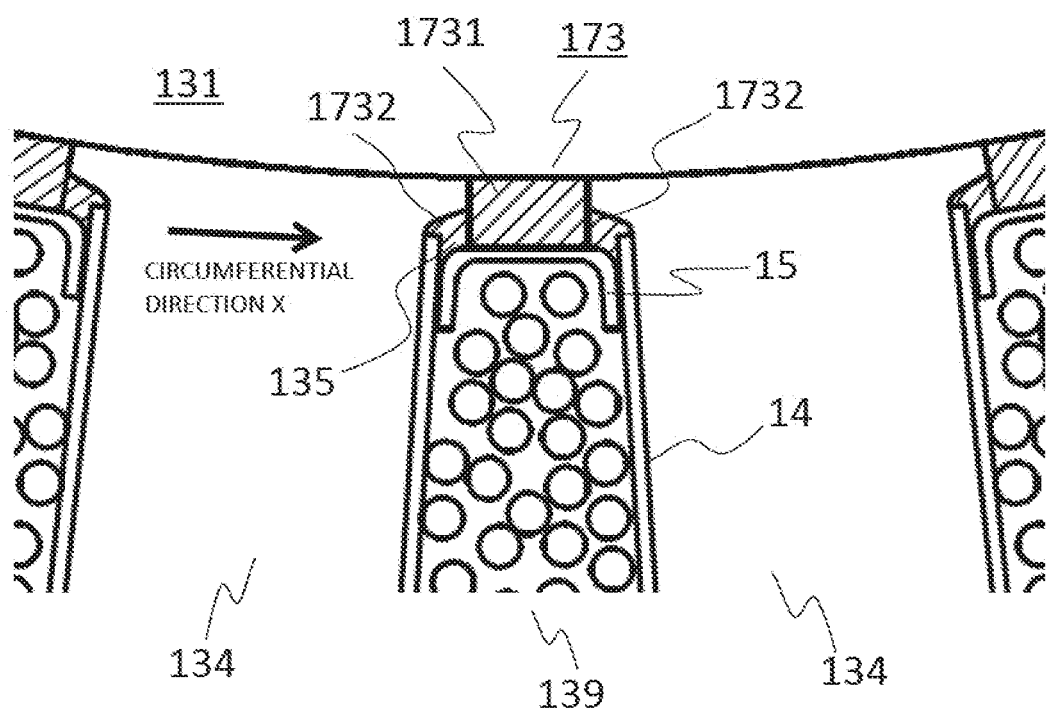
FIG. 20 is an enlarged view illustrating the vicinity of a slot opening of a stator core according to Example 6.

Example 6 is described with reference to FIG. 20.

Example 6 is an example of the magnetic wedge 173 that has the multi-layer structure in the circumferential direction X of the stator core 131. As illustrated in the drawing, the magnetic wedge 173 has a structure of having the first layer 1731 that is in contact with both side walls of the slot opening 135 and the second layer 1732 formed in lower portions on both side of the first layer 1731. The first layer and the second layer form a layer structure in the circumferential direction X. The slot liner 15 is in contact with the lower portion of the first layer 1731, and the second layer 1732 is in contact with both the slot liner 14 and the first layer 1731 which are mounted on both sides of the housing portion 139.

Here, the first layer and the second layer are configured of the kneaded substance of the magnetic powder and the resin; however, the density of the magnetic powder of the first layer is higher than the density of the magnetic powder of the second layer 1732. In addition, the same protrusion 181 as that of Example 5 is formed on the boundary between the first layer and the second layer, and thereby it is possible to increase the adhesion strength of both layers.

Incidentally, as another example, as described in the modification example of Example 5, the second layer 1732 may be a kneaded substance of the magnetic material and the resin, of which the magnetic powder density is lowered. Further, according to the other example, the second layer 1732 may not contain the magnetic material and may be the insulation material such as the resin or the varnish.

Example 7

Example 7 is described with reference to FIG. 21.

Example 7 is an example of the magnetic wedge that has the multiple layers and may be considered as another example of Example 6.

As illustrated in the drawing, the magnetic wedge 173 is configured of the first layer 1731 and the second layer 1732, and the first layer 1731 has a shape of extending in the radial direction Y (downward in FIG. 21) along the side wall of the slot opening 135, and a bottom portion thereof is in contact with the slot liner 15. Further, the first layer 1731 extends in the radial direction Y (downward) such that a width thereof increases in the circumferential direction X of the first layer, and both ends are in contact with the slot liner 14 disposed on both sides of the housing portion 139. The kneaded substance of the magnetic powder and the resin, which forms the first layer and the second layer, is the same as that of Example 6.

In such a configuration, it is possible to reduce an occurrence of a situation in which the first layer 1731 has a locally missing part by the magnetic suction force from the rotor core 121. Incidentally, the first layer 1731 has a shape of a lower portion thereof, of which a width increases in a curve; however, the shape is not limited to the curve shape, and the width may increase in a straight line. In addition, the shape of the second layer 1732 is not limited to the curve shape, and may be a straight line shape.

In this manner, the first layer 1731 containing the large amount of the soft magnetic powder is interposed between the second layers 1732, in which a ratio of the resin having high insulation property is large, in the circumferential direction X, and thereby it is difficult for a current to transmit through the second layer 1732, and it is possible to suppress an eddy current occurring in the stator core 131. Further, since it is easy for the flux to flow toward the rotor core, it is possible to achieve a reduction in loss.

Incidentally, in the examples described above, the electric motor (motor) is described as an example; however, the rotary electric machine of the invention can be applied as a power motor (motor) or a power generator (generator).

REFERENCE SIGNS LIST

100 Rotary electric machine
11 Rotary shaft
12 Rotor
121 Rotor core
13 Stator
131 Stator core
132 Slot
133 Coil
134 Teeth
135 Slot opening
136 Protruding portion
137, 138 Gap portion
14, 15 Slot liner
17 Soft magnetic powder/resin mixture
18 Atomized iron powder
19 Silicone resin
20 Slot liner
21 Spherical particle
31 Support body
32 Fulcrum
33 Sample
34 Indenter
173 Magnetic wedge
1731 First layer
1732 Second layer

The invention claimed is:

1. A rotary electric machine comprising:
   a stator core arranged opposing a circumferential surface of a rotor, in which multiple slots provided with openings formed to be open toward the rotor are formed in a circumferential direction;
   coils inserted into the slots, wherein
      a mixture of a soft magnetic powder and a resin material is formed in each of the openings of the slots, and a relative permeability of the mixture is 5 to 35, wherein
         a mixing ratio of the soft magnetic powder in the mixture is 50% by volume or higher and 85% by volume or lower, wherein
            magnetization property of the mixture depends on volume fraction of the soft magnetic powder; and
   a first slot liner disposed between the coils and the mixture,
   a second slot liner disposed on an inner wall of the slots with an opening toward the rotor, wherein
      the first slot liner is installed on an inner wall of the second slot liner to cover the opening of the second slot liner.

2. The rotary electric machine according to claim 1, wherein the mixture of the soft magnetic powder and the resin material is formed, with the resin material being interposed between the soft magnetic powder.

3. The rotary electric machine according to claim 1, wherein the soft magnetic body is an iron-silicon (Fe—Si) alloy.

4. The rotary electric machine according to claim 1, wherein the slot of the stator core is a semi-closed type slot.

5. The rotary electric machine according to claim 1, wherein the first slot liner is a polyethylene terephthalate (PET) sheet.

* * * * *